(12) United States Patent
Lee et al.

(10) Patent No.: US 8,811,537 B2
(45) Date of Patent: Aug. 19, 2014

(54) SIGNAL RECEIVING APPARATUS AND METHOD FOR WIRELESS COMMUNICATION SYSTEM USING MULTIPLE ANTENNAS

(75) Inventors: Il-Gu Lee, Seoul (KR); Jung-Bo Son, Daejeon (KR); Je-Hun Lee, Daejeon (KR); Eun-Young Choi, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 654 days.

(21) Appl. No.: 12/629,454

(22) Filed: Dec. 2, 2009

(65) Prior Publication Data

US 2010/0135437 A1 Jun. 3, 2010

(30) Foreign Application Priority Data

Dec. 3, 2008 (KR) .................. 10-2008-0121783
Nov. 24, 2009 (KR) .................. 10-2009-0113950

(51) Int. Cl.
*H04L 25/06* (2006.01)

(52) U.S. Cl.
USPC ........... 375/317; 375/324; 375/340; 375/345; 375/346; 375/349; 455/136; 455/138; 455/177.1; 455/200.1; 455/219; 455/232.1; 455/234.1; 455/234.2; 455/236.1; 455/239.1; 455/240.1; 455/241.1; 455/242.1; 455/242.2; 455/245.1; 455/245.2; 455/246.1; 455/247.1; 455/250.1; 455/251.1; 455/253.2

(58) Field of Classification Search
USPC ......... 375/316, 327, 324, 345, 346, 349, 317, 375/340; 455/136, 138, 177.1, 200.1, 219, 455/232.1, 234.1, 234.2, 236.1, 239.1, 455/240.1, 241.1, 242.1, 242.2, 245.1, 455/245.2, 246.1, 247.1, 250.1, 251.1, 455/253.2, 234.3, 329.1
See application file for complete search history.

(56) References Cited

U.S. PATENT DOCUMENTS

| | | | | |
|---|---|---|---|---|
| 6,178,269 | B1 * | 1/2001 | Acharya | 382/277 |
| 7,433,663 | B1 * | 10/2008 | Cheng | 455/250.1 |
| 2008/0181324 | A1 | 7/2008 | Waters et al. | |

OTHER PUBLICATIONS

Jungbo Son et al. "Design and Verification of High Throughput Transceiver for Next Generation Wireless LAN", Sep. 2006, IEEE, pp. 1-5.*
Il-Gu Lee et al., "Fast Automatic Gain Control Employing Two Compensation Loop for High Throughout MIMO-OFDM Receivers", *IEEE International Symposium on Circuits and Systems*, May 2006, 21-24, pp. 5459-5462.

* cited by examiner

*Primary Examiner* — Sophia Vlahos
(74) *Attorney, Agent, or Firm* — Staas & Halsey LLP

(57) ABSTRACT

Provided are a receiving apparatus and method for a wireless communication system using multiple antennas. A receiving method for a wireless communication system using multiple paths, the receiving method comprising: receiving signals through a predetermined number of multiple paths; sensing a carrier according to saturation state degrees of the signals, and providing saturation state information; calculating automatic gain components of the received signals by using the received signals and the saturation state information of the received signals; and performing a noise matching process to amplify noises on the predetermined multiple paths according to the automatic gain components during a predetermined period.

10 Claims, 11 Drawing Sheets

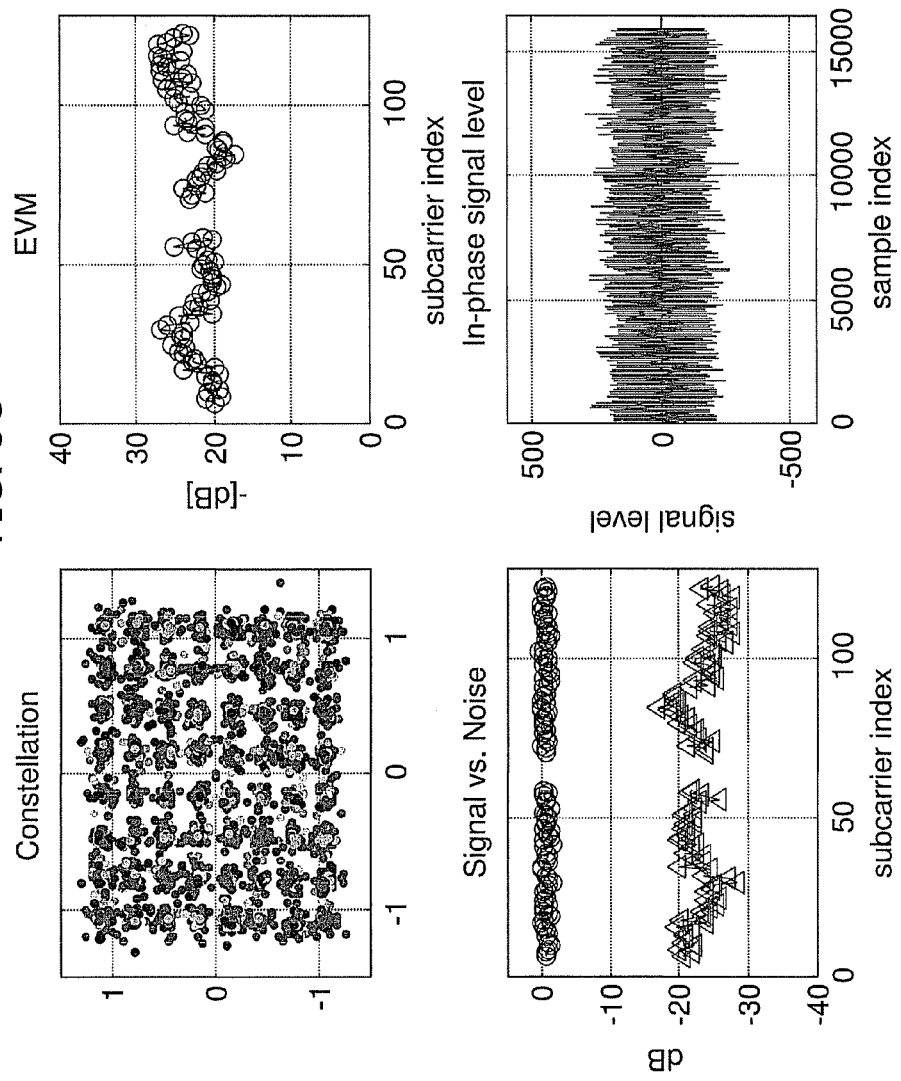

SIGNAL RECEIVING APPARATUS AND METHOD FOR WIRELESS COMMUNICATION SYSTEM USING MULTIPLE ANTENNAS

CROSS-REFERENCE(S) TO RELATED APPLICATIONS

The present application claims priority of Korean Patent Application Nos. 10-2008-0121783 and 10-2009-0113950, filed on Dec. 3, 2008 and Nov. 24, 2009, respectively, which are incorporated herein by reference in their entirety.

BACKGROUND OF THE INVENTION

1. Field of the Invention

Exemplary embodiments of the present invention relates to a signal receiving apparatus and method for a wireless communication system; and, more particularly, to a signal receiving apparatus and method for a wireless communication system using multiple antennas.

2. Description of Related Art

While the existing wireless communication systems have mainly provided voice services, the recent wireless communication systems increasingly tend to provide data services as well as voice services. In addition, the mainstream of data networks for providing data services has been cable-based data networks. However, many efforts to provide wireless services have been continuously made in order to ensure portability which is one of human being's basic desires. Thus, a variety of standards for high-speed wireless data transmission have been established and are now commercially available.

Examples of such wireless standards include wireless local area network (LAN), Wibro, WiMax, and so on. To meet the demands on a large amount of multimedia contents increasing in such wireless communication standards, advanced wireless transmission technologies have been used. Due to the use of such technologies, a data service supporting portability can be provided, and a video call and a large amount of multimedia contents can be used. Furthermore, examples of wireless communication technologies for high-speed data transmission include an Orthogonal Frequency Division Multiplexing (hereinafter, referred to as "OFDM") scheme, a Multi Input Multi Output (hereinafter, referred to as "MIMO") technology, and so on.

The OFDM scheme is to transmit a data stream not over a single carrier but over multiple subcarriers. In wireless communication channel environments, obstacles such as building cause multipaths, and the multipaths cause delay spread. When a transmission time of a next symbol is longer than a delay spread time, inter symbol interference (ISI) occurs. In this case, when viewed in a frequency domain, a frequency selective fading occurs selectively. When a single carrier frequency is used, an equalizer is used to remove ISI components. However, as the data rate increases, the complexity of the equalizer also increases.

In the OFDM scheme, data are transmitted in parallel at high speed over multiple subcarriers. Hence, a frequency selective fading of one subcarrier among the respective subcarriers may be solved. Furthermore, in order to prevent the distortion of the orthogonal component due to ISI caused by a wave delayed during transmission a guard interval is inserted to solve the interference. The OFDM scheme is widely used as a core technology in many fields, for example, 802.11 Wireless LAN, Digital Multimedia Broadcasting (DMB), Power Line Communication (PLC), xDSL, 4G mobile communication, and High-Speed Portable Internet (HPi).

Moreover, the existing wireless communication systems have mainly provided voice services, and channel coding has been widely used in order to overcome poor channel properties. However, as high-quality multimedia services enabling an anytime, anywhere calling have been demanded, the trend is moving from voice services to data services. To this end, there is a need for technology which transmits a large amount of data at faster speed and with less error. However, the mobile communication environment greatly distorts signals due to multipath, shadow effect, propagation attenuation, interference, and the like. Specifically, a fading phenomenon due to multipaths causes serious distortion of a signal given by combination of signals which have different magnitudes and phases through different paths. Such a fading phenomenon is one of problems which must be solved in high-speed digital communications. One of methods for solving such a problem is a MIMO system.

A MIMO system is an advanced version of a Single Input Single Output (hereinafter, referred to as "SISO") and use multiple antennas at a transmitting side and a receiving side. The MIMO system transmits and receives a plurality of signals through a plurality of antennas at a time. Hence, compared with an existing system, the MIMO system has an advantage that transmits a larger amount of data without increasing a bandwidth.

However, the MIMO system has a drawback in that it is vulnerable to ISI and frequency selective fading. To solve such a drawback, the MIMO system adopts the OFDM scheme. The OFDM scheme processes data in parallel, divides a high-speed data stream into a low-speed data stream, and simultaneously transmits the low-speed data stream over multiple carriers. Since low-speed parallel carriers are used, a symbol interval is increased and ISI is reduced. Furthermore, since a guard interval is used, ISI is removed almost completely. Moreover, since multiple carriers are used, the OFDM scheme is robust against a frequency selective fading. Consequently, by combining the two systems, the advantage of the MIMO system is used as it is, and the drawback of the MIMO system is eliminated using the OFDM system. A general type of a MIMO system uses N transmit (TX) antennas and N receive (RX) antennas.

For example, while an IEEE 802.11b wireless LAN system uses a complementary code keying (CCK) scheme and has a data rate of 11 Mbps, an IEEE 802.11g/a wireless LAN system adopting an OFDM scheme supports up to 54 Mbps, and an IEEE 802.11n wireless LAN system adopting a multiple antenna technology supports a physical layer data rate higher than 300 Mbps.

In addition, the most important consideration in the design of a wireless communication technology is the supportable throughput and the signal arrival distance. Although the IEEE 802.11n system provides a physical layer data rate of 300 Mbps, the throughput of 180 Mbps or higher may be difficult in theory. In order to obtain such a data rate, signals are transmitted through a physical layer by using a high-order modulation scheme such as a 64-QAM scheme at a low code rate such as a 5/6 code rate, and an aggregation or block ACK scheme is applied in order to minimize a header in a media access control (MAC) layer and thus reduce an overhead. However, this scheme is greatly affected by noise in a wireless communication system using multiple antennas.

In a multiple antenna receiver, noise distribution of the multiple antenna receiving paths has great influence on the performance of a detector for detecting signals received through multiple antennas. This is because it is assumed that noise distributions of the multiple antenna receiving paths are uniform in order to minimize the complexity of the detector. If the noise distribution is differently generated among the multiple receiving paths, a more complex algorithm is required for detecting the transmit signals at the receiving end, and a larger amount of hardware resources are used. According to the existing method, in order to equalize the noise distributions among the multiple receiving paths, a received signal is FFT-processed, and a magnitude of a noise signal at an unused frequency is calculated. In this way, noises of the multiple receiving ends are calculated, and its difference is compensated. However, this method must have complex hardware in order to calculate exact noise. Furthermore, when hardware is made in a simple structure, its accuracy is lowered, resulting in the degradation of system performance. Moreover, since a plurality of noise figures are not a time-varying function but is derived from a noise figure of an antenna and an analog device, the method which calculates a noise distribution at each time and reflects the calculated noise distribution may cause the performance degradation due to an estimation error. Consequently, there is a need for a modulator which has a simple hardware structure and a low complexity.

SUMMARY OF THE INVENTION

An embodiment of the present invention is directed to a receiving apparatus, which is capable of reducing complexity of hardware, and a receiving method thereof.

Another embodiment of the present invention is directed to a receiving apparatus, which is easy to implement, and a receiving method thereof.

Another embodiment of the present invention is directed to a receiving apparatus, which is capable of reducing an estimation error, and a receiving method thereof.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a receiving apparatus for a wireless communication system using multiple antennas includes: an RF unit including a predetermined number of receiving ends configured to receive signals received from a predetermined number of transmitting ends through multiple paths; a signal conversion and compensation unit configured to receive signals outputted from the RF unit, convert analog signals into digital signals, remove DC components from the digital signals, and compensate in-phase/quadrature-phase (I/Q) mismatch; a saturation based carrier sensing unit configured to sense a carrier according to saturation state degrees of the signals, and provide saturation state information; an automatic gain control unit configured to receive the digital signals and the saturation state information and perform an automatic gain control thereon; a noise matching amplification unit configured to amplify noises on the multiple paths according to a predetermined ratio by using information on the automatic gain control during a predetermined period provided from the automatic gain control unit; and a carrier frequency offset (CFO)/phase correction and fast Fourier transform (FFT) process unit configured to correct a carrier frequency offset of a signal outputted from the noise matching amplification unit, and perform an FFT process to compensate a phase of the signal outputted from the noise matching amplification unit.

In accordance with another embodiment of the present invention, a receiving method for a wireless communication system using multiple paths includes: receiving signals through a predetermined number of multiple paths; sensing a carrier according to saturation state degrees of the signals, and providing saturation state information; calculating automatic gain components of the received signals by using the received signals and the saturation state information of the received signals; and performing a noise matching process to amplify noises on the predetermined multiple paths according to the automatic gain components during a predetermined period.

BRIEF DESCRIPTION OF THE DRAWINGS

FIGS. 5A to 5G illustrate the real effects obtained when the embodiment of the present invention is applied.

DESCRIPTION OF SPECIFIC EMBODIMENTS

Figure 1:
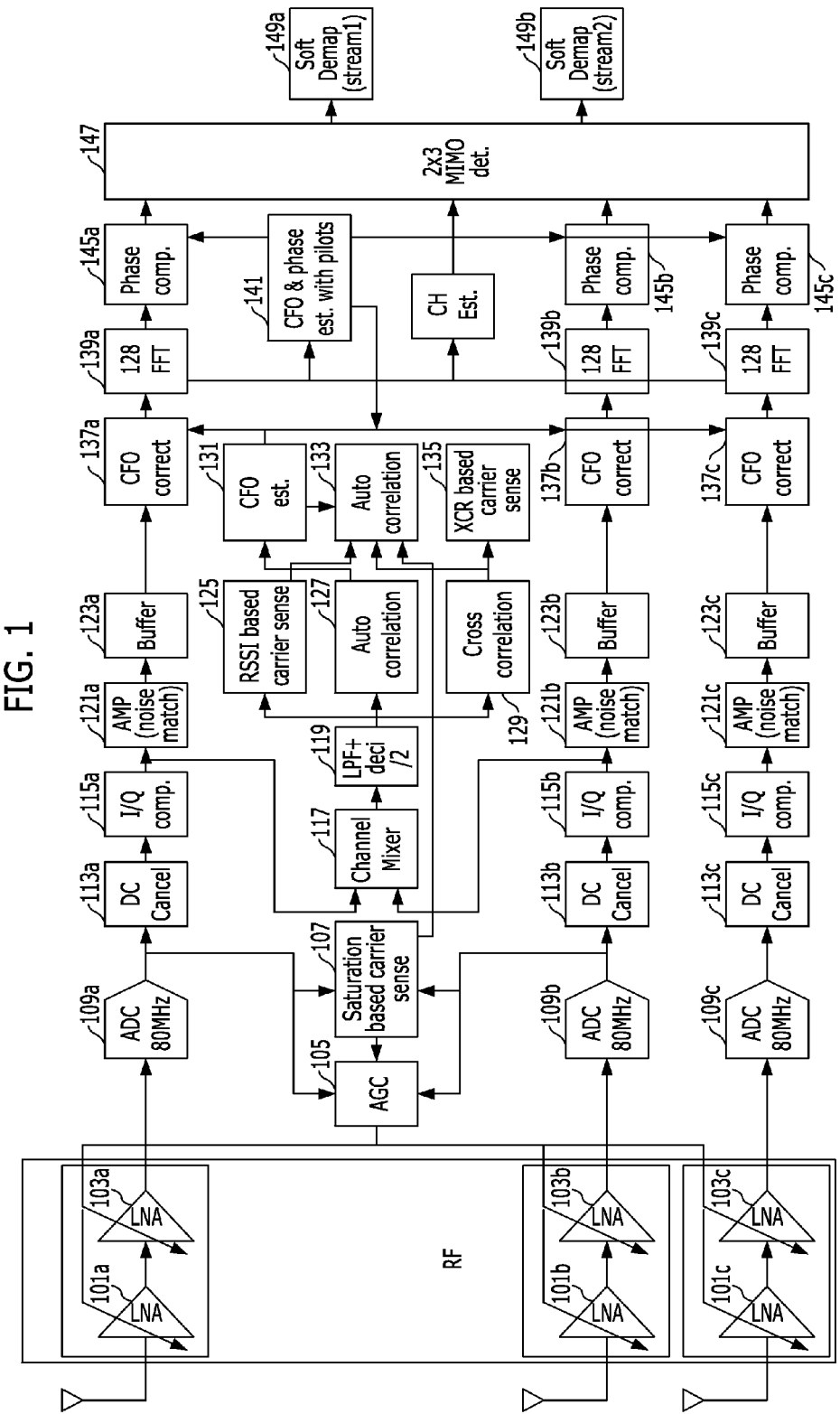
FIG. 1 illustrates an overall configuration of a receiver in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 illustrates an overall configuration of a receiver in accordance with an embodiment of the present invention.

Referring to FIG. 1, the receiver for receiving signals received through multiple antennas includes low noise amplifiers (LNAs) 101a to 101c, variable gain amplifiers (VGAs) 103a to 103c, an automatic gain controller (AGC) 105, a saturation based carrier sensor 107, analog-to-digital converters (ADCs) 109a to 109c, DC cancellers 113a to 113c, I/Q mismatch compensators 115a to 115c, a channel mixer 117, a low pass filter and decimator (LPF+deci/2) 119, noise matching amplifiers 121a to 121c, buffers 123a and 123c, a received signal strength indicator (RSSI) based carrier sensor 125, an auto-correlator 127, a cross-correlator 129, a carrier frequency offset (CFO) estimator 131, a frame synchronizer 133, an cross correlation based carrier sensor 135, CFO correctors 137a to 137c, a fast Fourier transform (FFT) processor 139a, a pilot based CFO and phase estimator 141, a channel estimator 143, phase compensators 145a to 145c, a MIMO detector 147, and soft demappers 149a to 149b.

In FIG. 1, the ADCs 109a to 109c, the DC cancellers 113a to 113c, and the I/Q mismatch compensators 115a and 115c are referred to as a signal conversion and compensation unit, and the buffers 123a to 123c, the CFO correctors 137a to 137c, and the FFT processor 139a, and the phase compensators 145a to 145c are referred to as a CFO/phase correction and FFT unit.

The operation of a MIMO receiver in accordance with an embodiment of the present invention will be described below with reference to FIG. 1. In an RF block 100 configured to process wireless signals received through a plurality of antennas, only the LNAs 101a to 101c and the VGAs 103a to 103c are illustrated. The LNAs 101a to 101c suppress and amplify noise from the signals received through the antennas, and the VGAs 103a to 103c control the noise level and the magnitudes of the received signals necessary for the VGA system.

The signals having an RF frequency band are converted into signals having a desired band in the RF block 100 and transmitted to the ADCs 109a to 109c. The ADCs 109a to 109c convert analog signals received from the RF unit 100 into digital signals. The digital signals are inputted to the DC cancellers 113a to 113c, the AGC 105, and the saturation based carrier sensor 107. First, the DC cancellers 113a to 113c remove DC tones generated through the RF circuit and digital conversion. The signals from which the DC tones are removed are inputted to the I/Q mismatch compensators 115a to 115c. The I/Q mismatch compensators 115a to 115c compensate mismatched components between an in-phase component and a quadrature-phase component, and transmit mismatch-compensated signals to the noise matching amplifiers 121a to 121c and the channel mixer 141. Although the noise matching amplifiers 121a to 121c adjust the magnitudes of the remaining signals with reference to the first signal according to the values of the programmable register in order to equalize noise power of the plurality of inputted signals, and transmit the adjusted signals to the buffers 123a to 123c. In this case, since it is assumed in FIG. 1 that signals are inputted through three antennas, the number of the inputted signals is 3. When it is assumed in FIG. 1 that three signals are inputted, the noise matching amplifiers 121a to 121c adjust the magnitudes of the second and third signals according to the programmed values of the register, that is, preset values which are previously stored in the register, in order to equalize noise powers of the second and third signals with reference to the first signal. The buffers 123a to 123c store the adjusted signals outputted from the noise match amplifiers 121a to 121c, read the adjusted signals, based on a specific period, and transmit the read signals to the CFO correctors 137a to 137c. The CFO correctors 137a to 137c detect and correct a carrier frequency offset. The carrier frequency offset of the received signal is compensated at an input buffer of the FFT block, and the frequency and phase error are compensated by estimating pilot signals after the FFT operation. A carrier frequency is compensated in time domain before the FFT operation.

The FFT processors 139a to 139c FFT-process the signals outputted from the CFO correctors 137a to 137c and transmit the FFT-processed signals to the phase compensators 145a to 145c. The phase compensators 145a to 145c compensate the phases of the FFT-processed signals, and the MIMO detector 147 detects signals based on antennas, bands, or streams. The soft demappers 149a to 149b demap the antenna-based, band-based or stream-based signals detected by the MIMO detector 147.

The output signals of the ADCs 109a to 109c are used to control the signal gain in the AGC 105. The saturation based carrier sensor 107 receiving the digital signals from the ADCs 109a to 109c performs a monitoring operation to detect signals according to saturation or non-saturation for the purpose of detecting the carrier signal, and provides signal level information to the AGC 105. In addition, the saturation based carrier sensor 107 transmits the signal level information to the frame synchronizer 133 in order to acquire the frame synchronization. The AGC 105 controls the gain values of the LNAs 101a to 101c and the VGAs 103a to 103c, based on the signal level information received from the saturation based carrier sensor 107.

Meanwhile, the channel mixer 117 mixes the signals outputted from the I/Q mismatch compensators 115a to 115c. The LPF and decimator 119 low-pass-filters the received signals and calculates an average value by dividing the decimal value by 2. The output of the LPF and decimator 119 is inputted to the RSSI based carrier sensor 125 and the auto-correlator 127, and the cross-correlator 129. The RSSI based carrier sensor 125 detects the carrier based on the RSSI, and transmits the detected carrier to the frame synchronizer 133. The auto-correlator 127 calculates an auto-correlation value and transmits the calculated auto-correlation value to the CFO estimator 131 in order to estimate the frequency offset. The cross-correlator 129 calculates a cross-correlation value and transmits the calculated cross-correlation value to the cross correlation based carrier sensor 135. The CFO estimator 131 estimates the carrier frequency offset (CFO) by using the auto-correlation value received from the auto-correlator 127, and provides the estimation result to the CFO correctors 137a to 137c and the frame synchronizer 133. The frame synchronizer 133 receives the signals from the RSSI based carrier sensor 125, the cross-correlator 129, the saturation based carrier sensor 107, and the CFO estimator 131, and detects the frame synchronization. The cross correlation based carrier sensor 107 senses the carrier based on a preamble cross-correlation.

In addition, the carrier may be sensed through the RSSI and XCR block by using the signal power and cross-correlation. The preamble signal in which the received signal strength is measured and known is used for the CFO estimation and frame symbol synchronization by using the auto-correlation and the cross-correlation. The carrier frequency offset is estimated using the auto-correlation, and the end of a short preamble using the cross-correlation of the input signal using the preamble. It is auto-detected whether the received signal is a legacy packet or a high throughput (HT) packet. Since a digital front end is performed using the first and second signals of three possible received signals, the complexity of implementation may be reduced. In accordance with the embodiment of the present invention, the complexity of implementation may be reduced by performing the digital front end using signals of the first and second paths of three paths.

The FFT processors 139a to 139c provide the FFT-processed information to the pilot based CFO and phase estimator 141 which estimates the carrier frequency offset and phase with a pilot. The estimated phase information is provided to the phase compensators 145a to 145c and the CFO correctors 137a to 137c. In addition, the FFT processor 117 provides information to the channel estimator 143 which performs the channel estimation, and the MIMO detector 147 outputs the stream-based signals by using the channel estimation information provided from the channel estimator 143.

Figure 2:
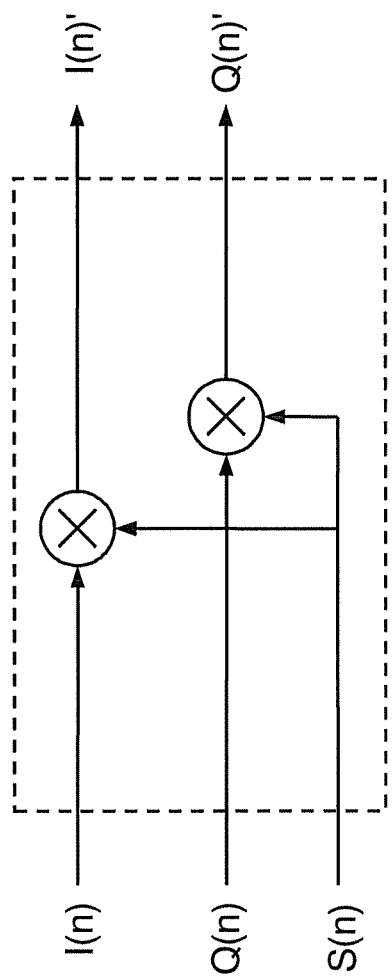
FIG. 2 is a conceptual diagram illustrating a modulation of a signal using an in-phase component and a quadrature-phase component.

FIG. 2 is a conceptual diagram illustrating a modulation of a signal using an in-phase component and a quadrature-phase component.

Referring to FIG. 2, a signal S(n) is multiplied by an in-phase component I(n) and a quadrature-phase component Q(n) to generate modulated signals I(n)' and Q(n)'.

The embodiment of the present invention will be described in more detail by using the following equations and the structure of the receiver. In the structure of the receiver in accordance with the embodiment of the present invention, when noise levels of receiving paths are different, noise levels are equalized by the digital noise matching amplifier. Programmable registers are provided to independently control gains of the respective receiving paths, and the noise level difference and the control degree of the respective registers are calculated during the calibration period and determined before the system starts to operate. In the wireless communication system having multi-path antennas, the reasons why it is important to match the noise levels will be described through the processing procedure of the received signal detection apparatus using the multiple antennas.

When a received signal is r, the signal to be modulated is expressed as Equation 1 below.

$$\hat{x} = \Delta (H^H H + \sigma^2 I)^{-1} H_r^H = H_r \qquad \text{Eq. 1}$$

In Equation 1 above, H is a channel impulse response matrix. Multiple antennas using three receiving ends and two transmitting ends, that is, 3×2 channels, will be exemplarily described. In Equation 1 above, $\Delta$ is a determinant of $H^H H$, $\sigma^2 I$ is a matrix obtained by multiplying an identity matrix by noise variance. H is a complex conjugate transpose. That is, H and $\Delta$ may be expressed as Equation 2 below.

$$H = \begin{bmatrix} h_{00} & h_{01} \\ h_{10} & h_{11} \\ h_{20} & h_{21} \end{bmatrix}, \Delta = \det(H^H H + \sigma^2 I) \qquad \text{Eq. 2}$$

At the receiving end, a weight w of a minimum mean square error (MMSE) may be defined as Equation 3 below.

$$w \equiv \Delta \left( (H^H H + \sigma^2 I)^{-1} H^H \right)^H \qquad \text{Eq. 3}$$
$$= \Delta H (H^H H + \sigma^2 I)^{-1}$$

In addition, $H^H + \sigma^2 I$ is expressed as Equation 4 below.

$$H^H H + \sigma^2 I = \begin{bmatrix} h_{00}^* & h_{10}^* & h_{20}^* \\ h_{01}^* & h_{11}^* & h_{21}^* \end{bmatrix} \begin{bmatrix} h_{00} & h_{01} \\ h_{10} & h_{11} \\ h_{20} & h_{21} \end{bmatrix} + \begin{bmatrix} \sigma^2 & 0 \\ 0 & \sigma^2 \end{bmatrix} \qquad \text{Eq. 4}$$

$$= \begin{bmatrix} |h_{00}|^2 + |h_{10}|^2 + & h_{00}^* h_{01} + h_{10}^* h_{11} + \\ |h_{20}|^2 + \sigma^2 & h_{20}^* h_{21} \\ h_{01}^* h_{00} + h_{11}^* h_{10} + & |h_{01}|^2 + |h_{11}|^2 + \\ h_{21}^* h_{20} & |h_{21}|^2 + \sigma^2 \end{bmatrix}$$

$$= \begin{bmatrix} N_0^2 & C \\ C^* & N_1^2 + \sigma^2 \end{bmatrix}$$

where * represents a complex conjugate.

In addition, $(H^H H + \sigma^2 I)^{-1}$ may be calculated using Equation 5 below.

$$(H^H H + \sigma^2 I)^{-1} = \frac{1}{\Delta} \begin{bmatrix} N_1^2 + \sigma^2 & -C \\ -C^* & N_0^2 + \sigma^2 \end{bmatrix} \qquad \text{Eq. 5}$$

$$= \frac{1}{\Delta} \begin{bmatrix} N_{p1}^2 & -C \\ -C^* & N_{p0}^2 \end{bmatrix},$$

where $$\Delta \equiv \det(H^H H + \sigma^2 I)$$
$$= N_{p0}^2 N_{p1}^2 - |C|$$
$$= N_0^2 N_1^2 - |C| + \sigma^2 (N_0^2 + N_1^2) + \sigma^4$$

Figure 3:
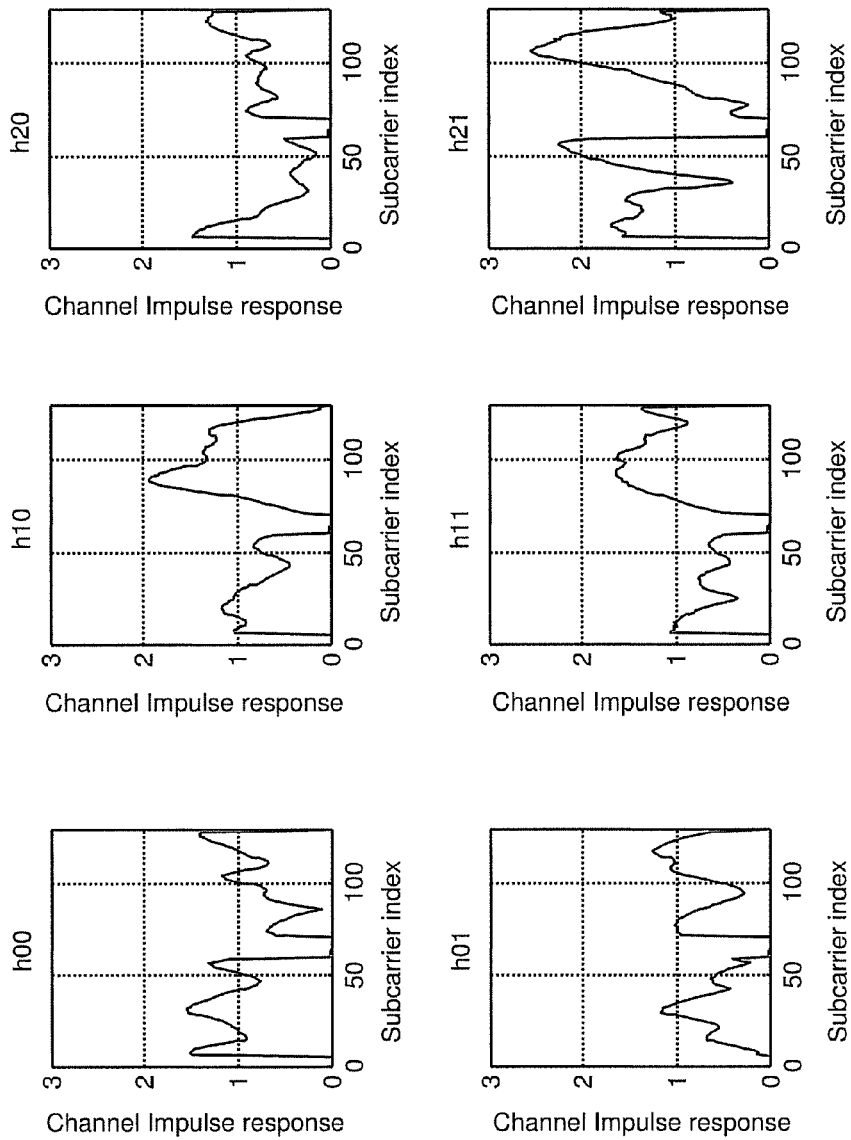
FIG. 3 illustrates channel impulses of the receiver, which are to be verified in accordance with the embodiment of the present invention.

FIG. 3 illustrates channel impulses of the receiver, which are to be verified in accordance with the embodiment of the present invention.

$h_{00}$, $h_{10}$, $h_{20}$, $h_{01}$, $h_{11}$, and $h_{21}$ have the channel impulse responses of FIG. 3 in the wireless communication. The case of $h_{21}$ refers to a signal which is transmitted from the second transmitting end and received by the third receiving end when three receiving ends and two transmitting ends are present. That is, it means that the signal is received through the second receiver over the third channel among signals received through three channels. Equations 1 to 5 above are derived on the assumption that noise variations equally generated on the multiple antenna paths. If the noise figures of the respective receive antenna paths are different, Equations 1 to 5 described above may be more complicated. To reduce the implementation complexity of the receiver and maximize the performance of the receiver, noises of the respective receiving paths are matched.

Figure 4:
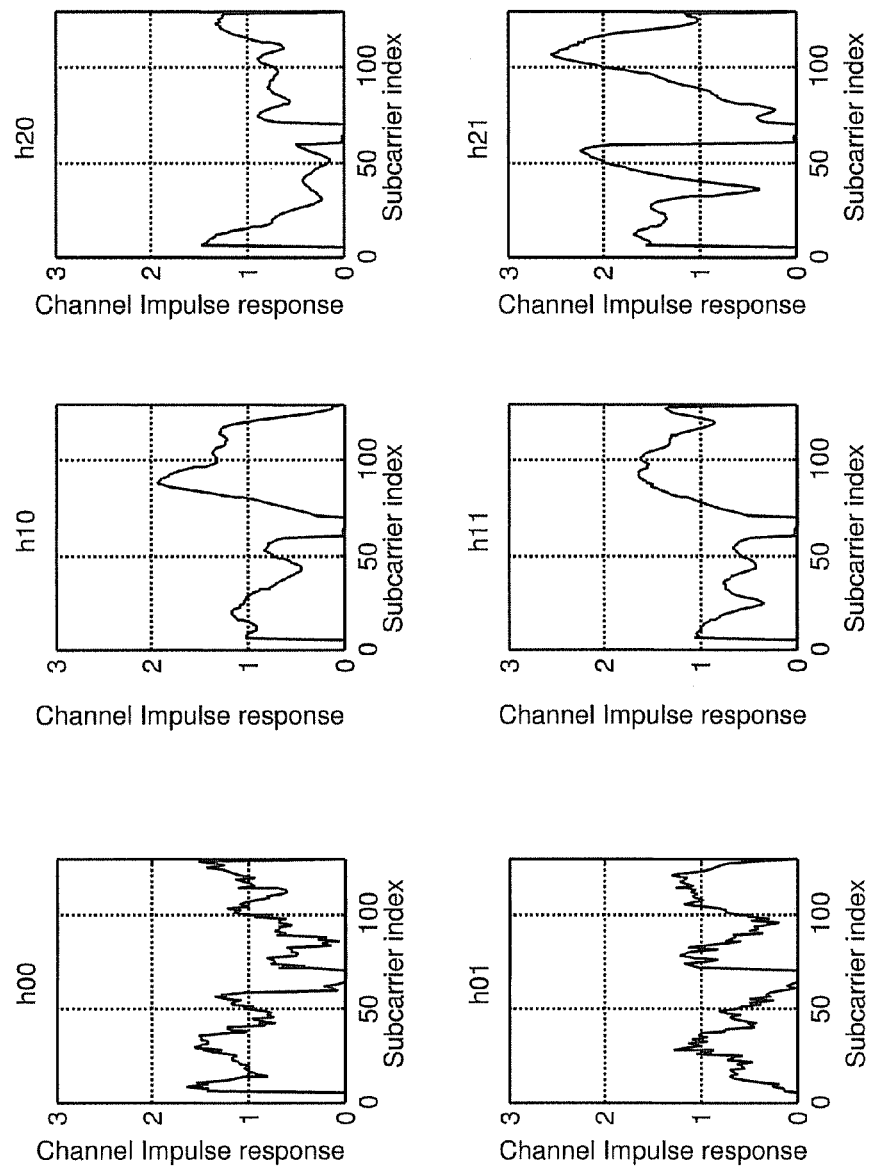
FIG. 4 illustrates signals when the noise of the first channel among the channel impulses of FIG. 3 is large.

FIG. 4 illustrates signals when the noise of the first channel among the channel impulses of FIG. 3 is large.

A large noise component occurs in the channel estimation result at $h_{00}$ and $h_{01}$. In this case, since an overall noise is large, the performance is further degraded than that described above. However, in addition to this problem, degradation is caused in the received signal detector using multiple antennas by the noise mismatch problem. To solve those problems, a calibration period is set, and a noise matching process is performed according to a given protocol before the system starts to operate.

For example, assuming that three receiving paths are present, when the noise ratio is the first path:the second path:the third path=8:4:2, the noise matching amplifiers 121a to 121c calibrate the noise magnitudes of other paths with respect to the receiving path having the largest signal magnitude based on the automatic gain control calculated in the AGC 105. If the first path is the largest receiving path during the calibration period, the second path is multiplied by 2 and the third path is multiplied by 3. If the second path is the largest receiving path, the first path is multiplied by ½ and the third path is multiplied by 2. On the other hand, if the third path is the largest receiving path, the first path is multiplied by ¼ and the second path is multiplied by ½. In this manner, the noise distribution magnitudes are equally matched.

This is done for preventing signal distortion caused by the saturation states of the receiving ends because the VGA gains and LNA gains may be different at the respective receiving paths. That is, as the measurement result of the signal magnitude for the automatic gain control, the distortion caused by the signal saturation may be prevented by matching the noise distribution with reference to the receiving path having the largest signal level. Since the exact calculation of the amount of noise is complicated and difficult in hardware, a protocol for a series of procedures is defined as follows.

For example, the scaling factors of the digital amplifiers of the remaining two paths, centering on the path having the largest received signal, are set to be gradually increasing and the performance indexes are checked. If the performance gets worse, the scaling factors are set to be gradually decreasing and the performance indexes are checked. Even in this case, if the performance gets worse, one receiving path is increased while the other receiving path is decreased, and the performance indexes are checked. The interval and order of the scaling factors are made using the registers in a programmable manner. Furthermore, the noise distribution calibration using the protocol during the calibration mode is enabled/disabled (On/Off), and its setting is possible with the fixed register values based on the manually measured noise distribution. Therefore, the stable noise match is always possible at the multiple antenna receiving ends.

<Specific Effects of the Invention>

FIGS. 5A to 5G illustrate the real effects obtained when the embodiment of the present invention is applied.

An 802.11n wireless LAN system having two transmitting ends and three receiving ends will be described as an example of the system in accordance with an embodiment of the present invention. When the receiving path of one of the three receiving ends has a higher noise figure than the remaining paths, the performance of the MIMO detector may be degraded by the noise mismatch phenomenon. In this case, when the embodiment of the present invention is applied, the noise mismatch phenomenon may be mitigated using the noise amplifier at the digital front end.

Figure 5A:
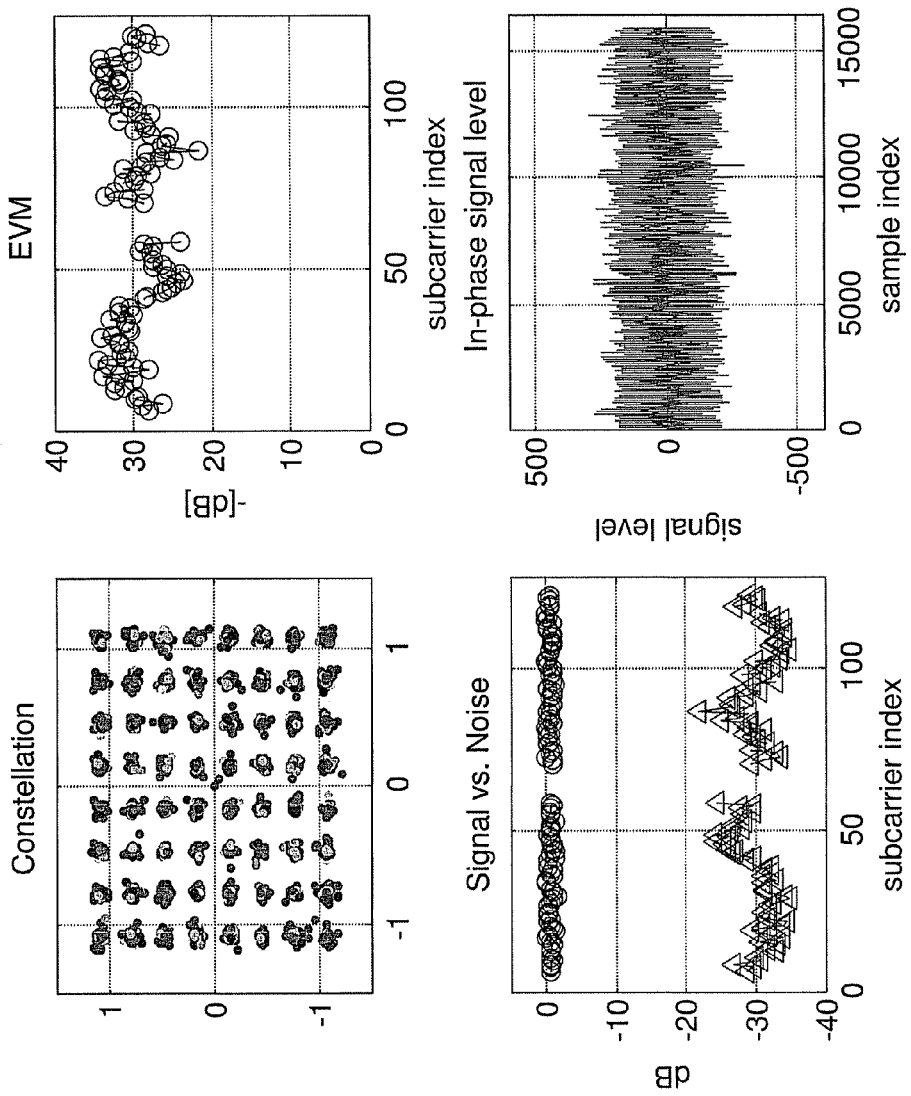
Figure 5B:
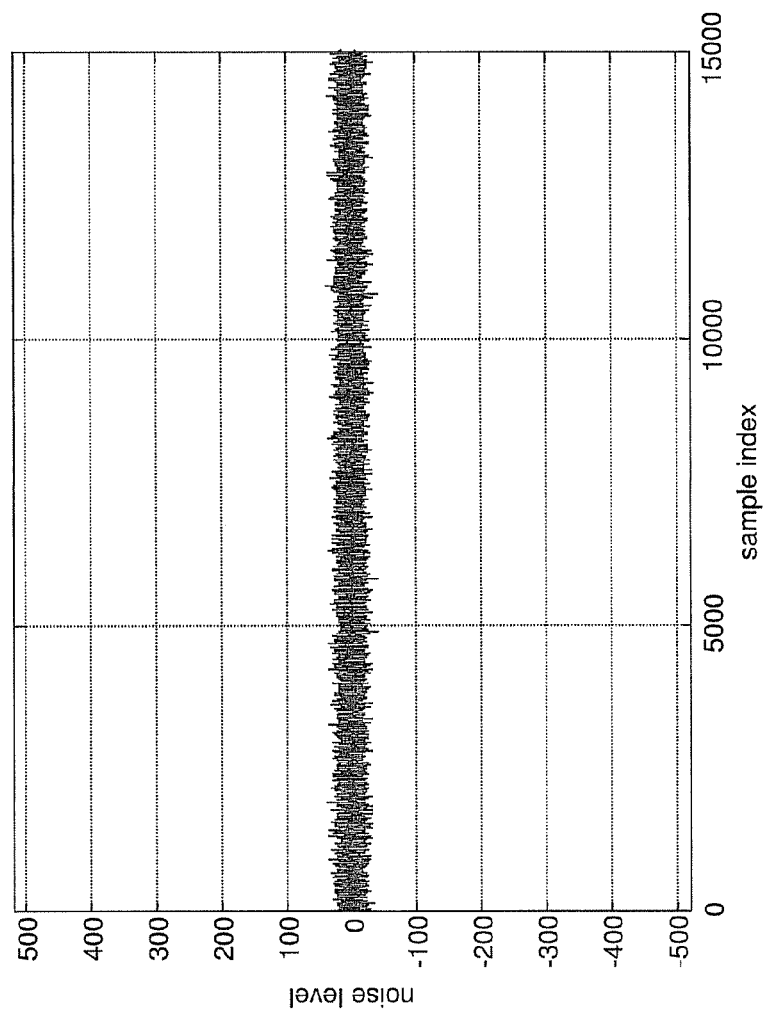
Figure 5D:
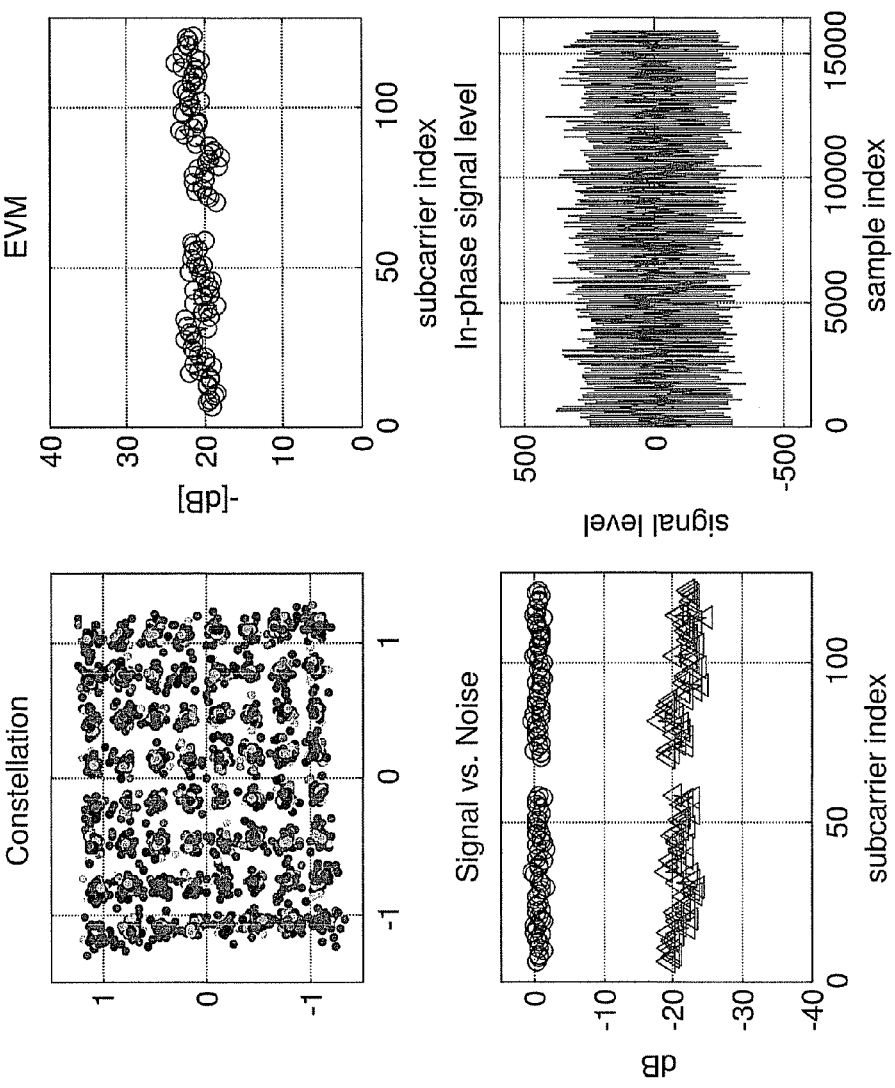
Figure 5E:
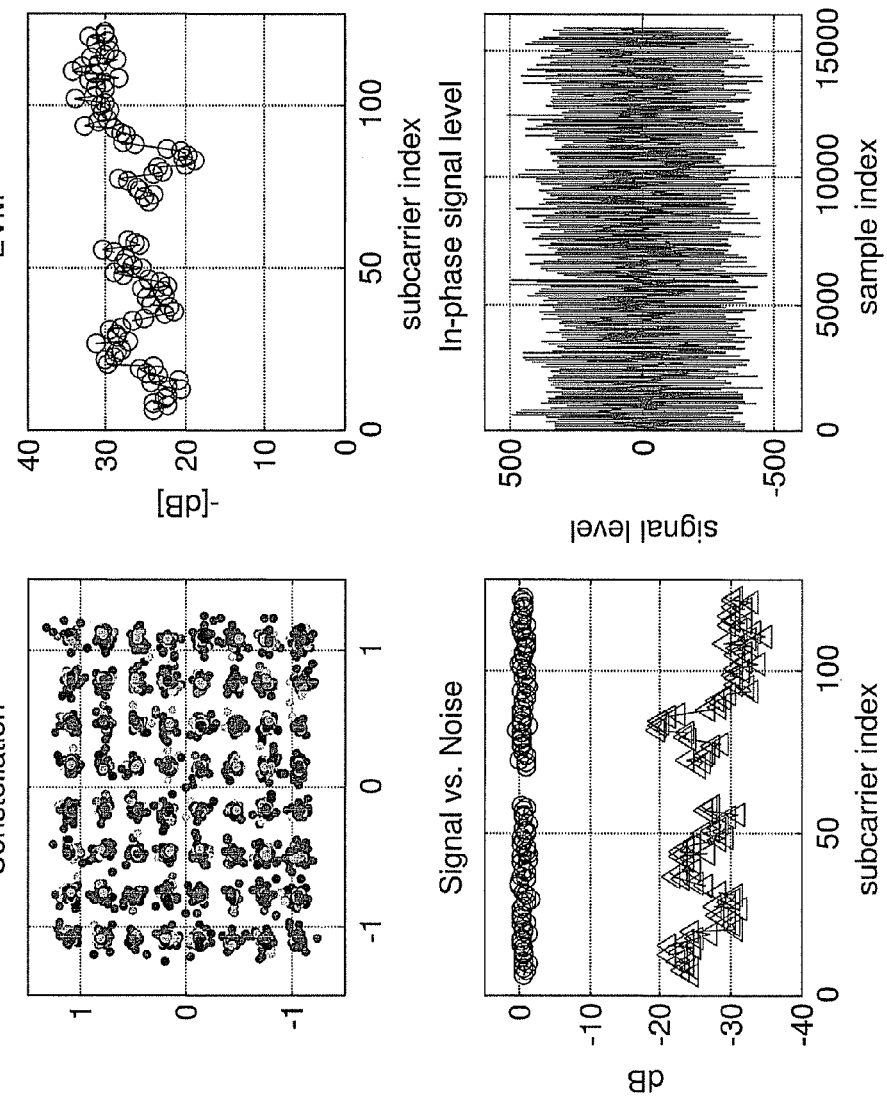
Figure 5F:
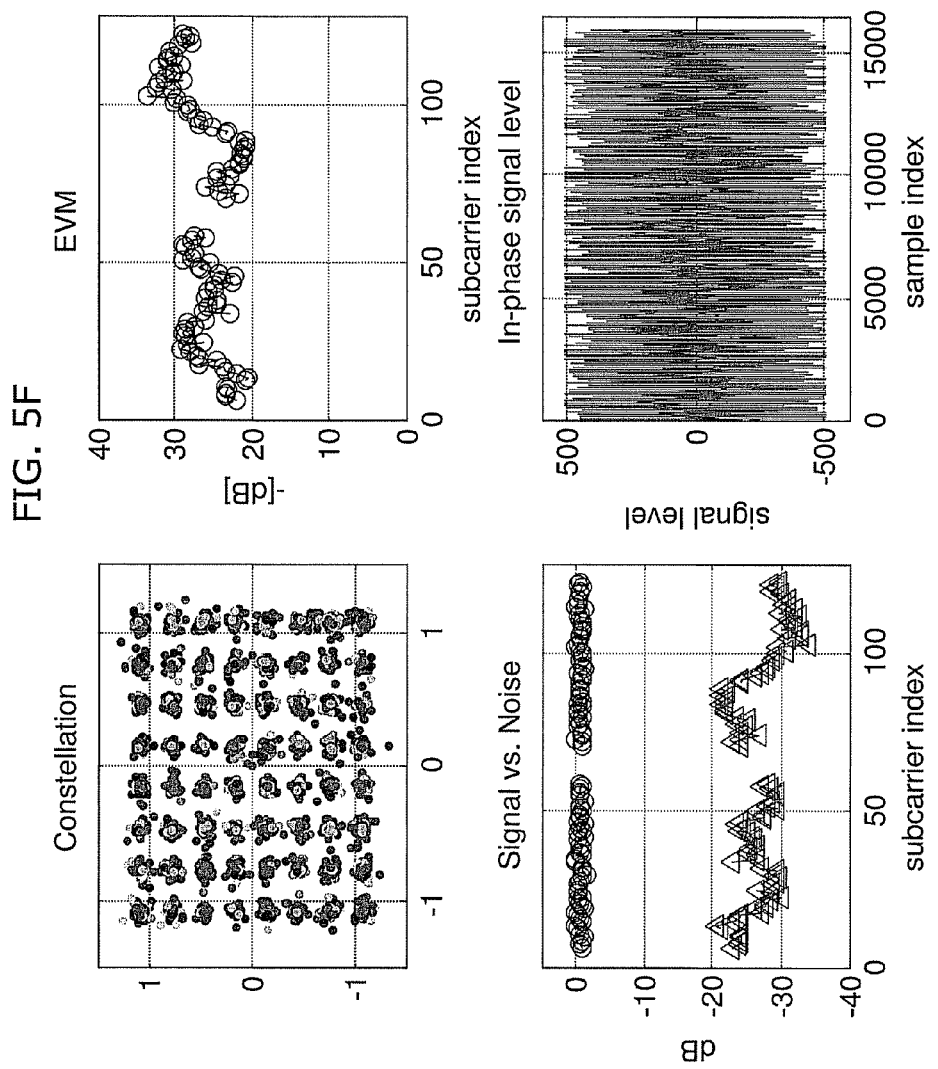
Figure 5G:
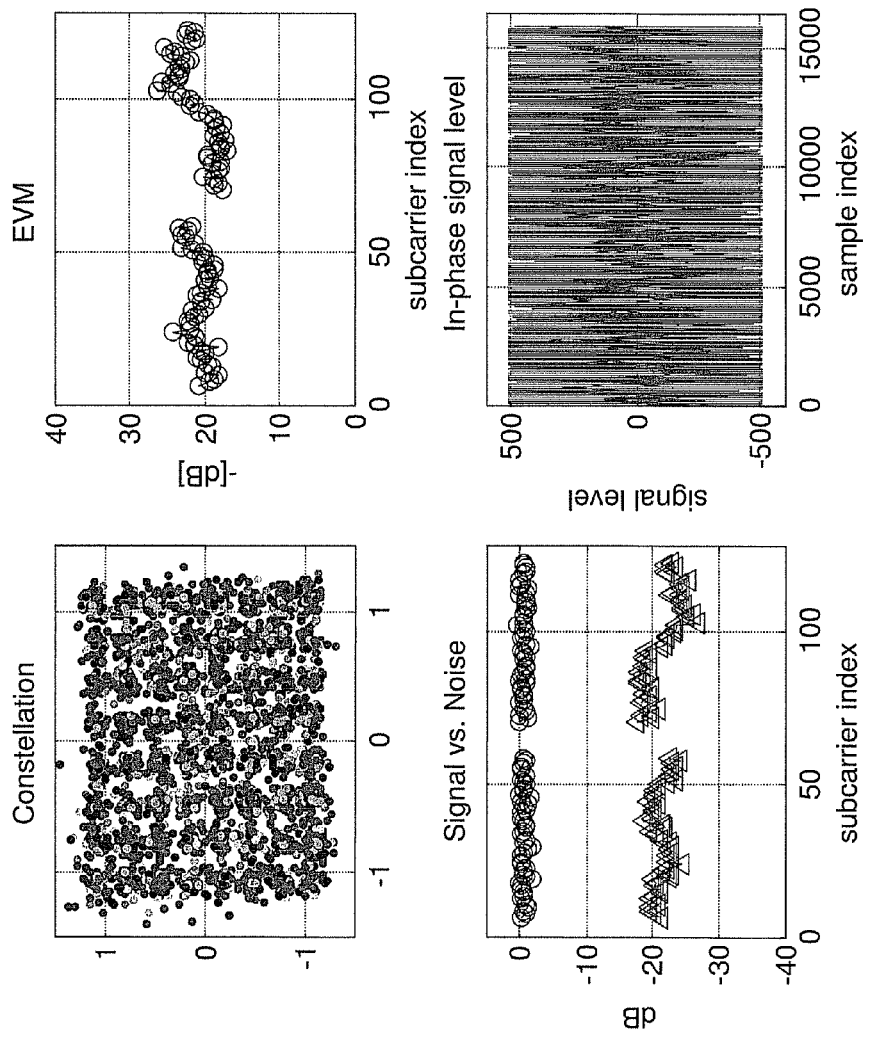

FIG. 5A shows the effect when the three paths of the receiving end have the same noise component. When assuming that the three paths of the receiving ends have the same noise component, an error vector magnitude (EVM) performance of −28.68 dB may be obtained. The EVM is obtained by measuring a difference between an ideal waveform and a detected waveform. This difference is called an error vector, and is referred to in relation to an M-ary I/Q modulation system such as a quadrature phase shift keying (QPSK) and represented on an I/Q constellation plot of the modulated signal. FIG. 5B shows the noise component the first path of the three paths may additionally have. FIG. 5C shows a case where the embodiment of the present invention is not applied, that is, a case where the amplification rate is 1.0. FIGS. 5D to 5G show a case where the embodiment of the present invention is applied, that is, a case where the amplification rate gradually increases. In FIGS. 5D to 5G, the amplification rate gradually increases from 1.5 by 0.5 so that the amplification rat of FIG. 5G becomes 2.5. As shown in FIG. 5C, when the noise components are mismatched, the EVM performance is −22.9 dB which corresponds to approximately 6.7 dB performance degradation. However, as the amplification rates of the remaining two paths gradually increase, the EVM performance is improved. That is, the EVM performance of −25.9 dB is obtained at 2.5 times the amplification rate. Consequently, approximately 3 dB performance improvement may be obtained compared with the case where the embodiment of the present invention is not applied. In this case, if the two paths where the amplification rates increase exceed a predetermined bit number, the samples are clapped and thus the performance degradation may occur. In this experiment, 10 bits were used, and the samples exceeding the range from −512 to +511 were processed by the number of the clapped samples and divided by a total number of the samples to thereby represent the occurrence probability of the samples. According to the experimental result, the performance improvement obtained by the noise matching was further greater than the performance degradation caused by the clapping up to the clapping rate of approximately 10%. Consequently, the entire EVM performance was obtained. However, as the clapping rate gradually increases, the performance degradation caused by the clapping was greater than the performance improvement obtained by the noise matching of the multiple paths, thus degrading the EVM.

The signal receiving apparatus and method in accordance with the exemplary embodiments of the present invention are capable of reducing complexity of hardware and estimation error and are easy to implement.

While the present invention has been described with respect to the specific embodiments, it will be apparent to those skilled in the art that various changes and modifications may be made without departing from the spirit and scope of the invention as defined in the following claims.

What is claimed is:

1. A receiving apparatus for a wireless communication system using multiple antennas, the receiving apparatus comprising:
    an RF unit comprising a predetermined number of receiving ends configured to receive signals received from a predetermined number of transmitting ends through multiple paths;
    a signal conversion and compensation unit configured to receive signals outputted from the RF unit, convert analog signals into digital signals, remove DC components from the digital signals, and compensate in-phase and quadrature-phase (I/Q) mismatch;
    a saturation based carrier sensing unit configured to sense a carrier according to saturation state degrees of the digital signals, and provide saturation state information;
    an automatic gain control unit configured to receive the digital signals and the saturation state information and perform an automatic gain control thereon;
    a noise matching amplification unit configured to equalize noise levels on the multiple paths by amplifying and attenuating as needed according to a predetermined preset ratio previously stored in a programmable register by using information on the automatic gain control during a predetermined period, the information provided from the automatic gain control unit; and
    a carrier frequency offset (CFO)/phase correction and fast Fourier transform (FFT) process unit configured to correct a carrier frequency offset of a signal outputted from the noise matching amplification unit, and perform an FFT process to compensate a phase of the signal outputted from the noise matching amplification unit,
    wherein the predetermined preset ratio is determined by selecting a ratio responsive to the path having the largest signal magnitude among the multiple paths, and
    wherein the path having the largest signal magnitude is determined by noise calibration.

2. The receiving apparatus of claim 1, wherein the signal conversion and compensation unit comprises:
    an analog-to-digital converter configured to receive the signals outputted from the RF unit, and convert the analog signals into the digital signals;
    a DC controller configured to remove DC components of the digital signals; and
    an I/Q mismatch compensator configured to compensate a mismatch of the in-phase component and the quadrature-phase component in the signals from which the DC components are removed.

3. The receiving apparatus of claim 1, wherein the CFO/phase correction and FFT process unit comprises:
    a CFO corrector configured to correct a carrier frequency offset of the signal outputted from the noise matching amplification unit;
    an FFT processor configured to perform an FFT process on the CFO-corrected signal; and a phase compensator configured to compensate a phase of the FFT-processed signal.

4. The receiving apparatus of claim 1, comprising:
a plurality of: signal conversion and compensation units, and CFO/phase correction and FFT process units, the plurality being equal to the predetermined number of receiving ends, wherein a single one among the plurality of signal conversion and compensation units and CFO/phase correction and FFT process units, corresponds to a single receiving end of the predetermined number of receiving ends.

5. The receiving apparatus of claim 1, wherein the predetermined preset ratio equalizes noise levels of the signals received through the multiple paths in the noise matching amplification unit.

6. The receiving apparatus of claim 5, wherein the noise matching amplification unit adjusts the predetermined preset ratio by using a fixed register value, based on a result of the automatic gain control determined during the predetermined period.

7. A receiving method for a wireless communication system using multiple paths, the receiving method comprising:
receiving signals through a predetermined number of multiple paths;
sensing a carrier according to saturation state degrees of the signals, and providing saturation state information;
calculating automatic gain components of the received signals by using the received signals and the saturation state information of the received signals; and
performing a noise matching process to equalize noise levels on the predetermined multiple paths by amplifying and attenuating as needed according to a predetermined preset ratio previously stored in a programmable register, by using information on the automatic gain components during a predetermined period,
wherein the predetermined preset ratio is determined by selecting a ratio responsive to the path having the largest signal magnitude among the multiple paths, and
wherein the path having the largest signal magnitude is determined by noise calibration.

8. The receiving method of claim 7, wherein the noise matching process is performed for a number of times equal to the predetermined number of the multiple paths, and a single noise matching process corresponds to a single multiple path.

9. The receiving method of claim 7, wherein the predetermined preset ratio equalizes noise levels of the signals received through the multiple paths in the noise matching process.

10. The receiving method of claim 7, wherein the noise matching process adjusts the predetermined preset ratio by using a fixed register value, based on a result of the automatic gain control determined during the predetermined period.

* * * * *